(12) United States Patent
Lauper

(10) Patent No.: US 8,302,850 B2
(45) Date of Patent: *Nov. 6, 2012

(54) METHOD WITH WHICH A TERMINAL CAN RETRIEVE INFORMATION ASSOCIATED TO AN EPC-CODE FROM AN EPC NETWORK

(75) Inventor: Eric Lauper, Bern (CH)

(73) Assignee: Swisscom AG (CH)

( * ) Notice: Subject to any disclaimer, the term of this patent is extended or adjusted under 35 U.S.C. 154(b) by 471 days.

This patent is subject to a terminal disclaimer.

(21) Appl. No.: 12/499,959

(22) Filed: Jul. 9, 2009

(65) Prior Publication Data

US 2009/0266876 A1 Oct. 29, 2009

Related U.S. Application Data

(63) Continuation of application No. 11/652,793, filed as application No. PCT/EP2005/052989 on Jun. 27, 2005, now Pat. No. 7,571,863.

(30) Foreign Application Priority Data

Jul. 16, 2004 (EP) ..................................... 04103422

(51) Int. Cl.
*G06F 17/00* (2006.01)

(52) U.S. Cl. ........................................ 235/375; 235/380

(58) Field of Classification Search .................. 235/375, 235/380, 382.5, 383, 379, 492, 493
See application file for complete search history.

(56) References Cited

U.S. PATENT DOCUMENTS

| | | | |
|---|---|---|---|
| 5,938,730 A | 8/1999 | Tobita | |
| 6,327,701 B2 | 12/2001 | Ungar | |
| 7,128,265 B2 * | 10/2006 | Silverbrook et al. | .... 235/462.08 |
| 7,203,158 B2 * | 4/2007 | Oshima et al. | ................. 370/208 |
| 2004/0108379 A1 * | 6/2004 | Chien | ............................ 235/385 |
| 2005/0071425 A1 | 3/2005 | Chung et al. | |

FOREIGN PATENT DOCUMENTS

| | | |
|---|---|---|
| JP | 2002027344 A | 1/2002 |
| WO | 2004038567 A1 | 5/2004 |

OTHER PUBLICATIONS

David L. Brock: "The Electronic Product Code (EPC) as a Meta Code" (Sep. 1, 2003). XP-002352423.
David L Brock: "The Electronic Product Code (EPC) A Naming Scheme for Physical Objects" (Apr. 1, 2001). XP-002352424.
David L. Brock "The Virtual Electronic Product Code" (May 1, 2002). XP-002352425.
Florian Edlbauer: CeBIT: Philips zeight NFC-Anwendungen. (Mar. 13, 2004). XP-002353044.
"RFID's and Democratic Capitalism" (Apr. 18, 2004. XP-0002353045.

* cited by examiner

*Primary Examiner* — Thien M Le
(74) *Attorney, Agent, or Firm* — McAndrews, Held & Malloy, Ltd.

(57) ABSTRACT

A method is disclosed with which a terminal (3) can retrieve information associated to an EPC code from an EPC network (4, 5, 6, 7). The EPC code is virtual, is generated independently of RFID tags and is stored permanently and is not—or not permanently—associated to an RFID tag. A terminal (3) sends a message with the EPC code over a telecommunication network (4) to an object name server (6), the server (6) replies with the address of the desired PML page and the terminal (3) access the content of said PML page. The invention also relates to a corresponding device.

21 Claims, 3 Drawing Sheets

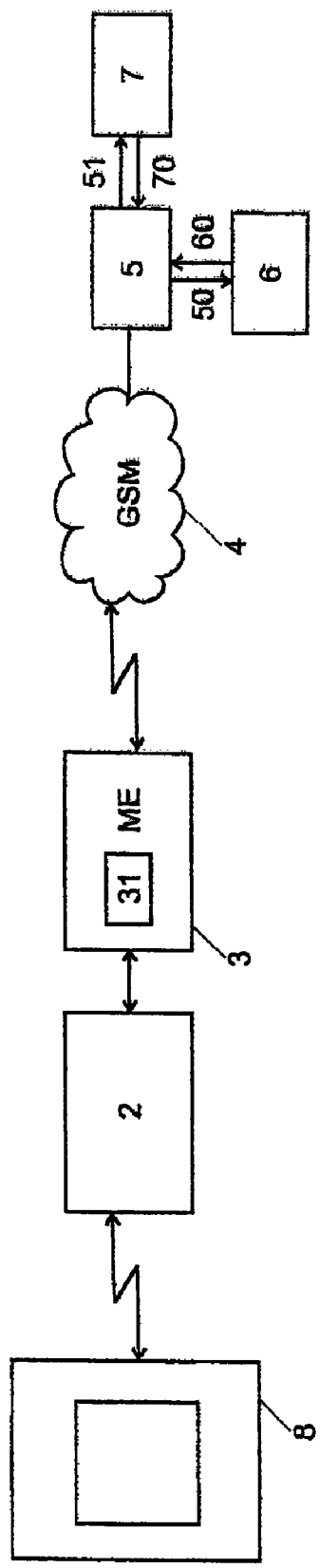
Fig. 4
Fig. 5

METHOD WITH WHICH A TERMINAL CAN RETRIEVE INFORMATION ASSOCIATED TO AN EPC-CODE FROM AN EPC NETWORK

REFERENCE DATA

This application is a continuation of U.S. patent application Ser. No. 11/652,793, filed on Jan. 12, 2007, incorporated herein by reference, which is a continuation of International Patent Application of PCT/EP200SIOS2989 (W02006/008223) filed on Jun. 27, 2005 claiming Convention priority of European application 2004EP-103422 (EP1583000) filed Jul. 16, 2004, the contents whereof are also hereby incorporated by reference.

TECHNICAL FIELD

The present invention concerns a method with which a terminal can retrieve information associated to an EPC code from an EPC network according to the preamble of claim 1 and a device with the characteristics of claim 15.

STATE OF THE ART

Methods are already known for obtaining information about a product on the basis of a so-called RFID element (or tag). For this, some tags have a memory area that can be read contactlessly with an RFID reader device and in which the desired information is stored. As the price of the tag depends considerably on the size of the memory, such tags are used especially if only little information is needed, for example the product manufacture date, a serial number, etc.

Other methods are also known in which the desired information is retrieved from an external database in which information relating to several tags is stored. In this case, a code located in the tag is read and is used as search criteria in the external database from which the desired information is retrieved. The connection between a product and a set of data in the database is static and permanent; a product marked with a tag always results in access to the same information.

The supplied information content then mostly depends only on the class of the object (type of product). Methods are however also known where all individual objects are marked by an individual code in the RFID tag (for example a serial number). With this individual code, it is possible to retrieve for each single product product-specific information (for example the expiration date or the guarantee period) from an external database.

The EPC global system (electronic Product Code Global System) has proposed RFID tags with EPC codes with which among others the widespread barcodes are to be replaced or completed. EPC codes are numbers that contain a header and three sets of data. One set of data identifies a product manufacturer, a second set the exact type of product and a third set is a serial number that marks each individual product individually. EPC codes with 64 and 96 bits have been proposed; they could possibly be more.

EPC codes are stored in RFID tags. EPC-compatible RFID tags communicate with RFID reader devices contactlessly over a local radio interface and according to an open standard. An EPC-capable RFID tag contains a single EPC code and each EPC code is associated with a single RFID tag. Each EPC RFID tag is thus unique; reading an EPC RFID tag allows the reader to retrieve information that can be different from the information that is retrieved from another EPC RFID tag. Each product marked with an EPC code is thus associated with individual, possibly unique information.

EPC reader devices use a software technology called Savant for retrieving the information associated with an EPC tag from a server in an EPC network. For this purpose, the RFID reader device sends a message with the read EPC code over the EPC telecommunication network to an object name server ONS. The object name server replies with the address of the desired PML page on which the data content associated with the EPC RFID tag is stored in PML format. The PML format (Product Marking Language) is also supported by EPC Global. The terminal can then with this address access the content of said PML page.

A restriction of the EPC system is that the system is only suitable for retrieving information over products marked with an EPC-compatible RFID tag. Many products are however marked with tags that are not EPC-compatible or they are not marked at all. Furthermore, certain products cannot be marked at all, for example because they are too small or because they are of metal and thus hardly allow data transmission over a radio interface. Furthermore, intangible goods, for example computer data, including data and software, or services are not marked with an RFID tag.

Another limitation is that access to data associated with a product is possible only over a suitable EPC-compatible RFID reader device. Such reader devices are however not always available.

Furthermore, different users in different situations often need different information over the same product. A product manufacturer will for example want to know when the product was produced whilst an end user will perhaps be more interested in the use-by date. The language of the desired information is also user-dependent.

Often, a homogenous comprehensive information content is provided that is supposed to fulfill the most differing needs. Such a content is however difficult and expensive to transmit over the telecommunication network and is time-consuming to read.

SUMMARY OF THE INVENTION

It is thus an aim of the present invention to propose a new method with which these problems can be solved.

These aims are achieved in particular with a method with which a terminal can retrieve information associated to an EPC code from an EPC network, wherein said EPC code is a virtual code that is generated independently from an RFID tag and that is stored permanently independently from an RFID tag.

These aims are achieved also with a device corresponding to claim 15 in that they include means for generating EPC codes independently of EPC RFID tags, and include means for storing EPC codes independently of EPC RFID tags and have communication means for sending said EPC codes to an EPC network.

It is thus possible to use the entire infrastructure of the PEC network and to retrieve data and information from this network without having to provide an EPC-compatible RFID tag. Instead, virtual EPC codes are used. Virtual EPC codes have a standardized format for EPC numbers and at least one of the following features:

They are not permanently or never associated with an RFID tag.
They are not or never embedded in an RFID tag.
They can be used for retrieving information from an EPC network without having to be read previously from an RFID tag.
They are generated independently of RFID tags.

Virtual EPC codes can be stored in memory areas outside EPC-compatible RFID tags and/or be generated dynamically.

In this manner, information from the EPC network, e.g. PML pages, can be associated with goods that are not marked with an RFID tag, including intangible goods such as computer files, computer programs, services, etc.

BRIEF DESCRIPTION OF THE FIGURES

The present invention will be described hereinafter in more detail on the basis of the figures, in which:

FIG. 4 shows a block diagram of a system with a terminal, an RFID reader device and an RFID code generator that generates virtual EPC codes, and FIG. 5 represents the structure of a message with a code according to the invention.

WAYS OF EXECUTING THE INVENTION

Figure 1:
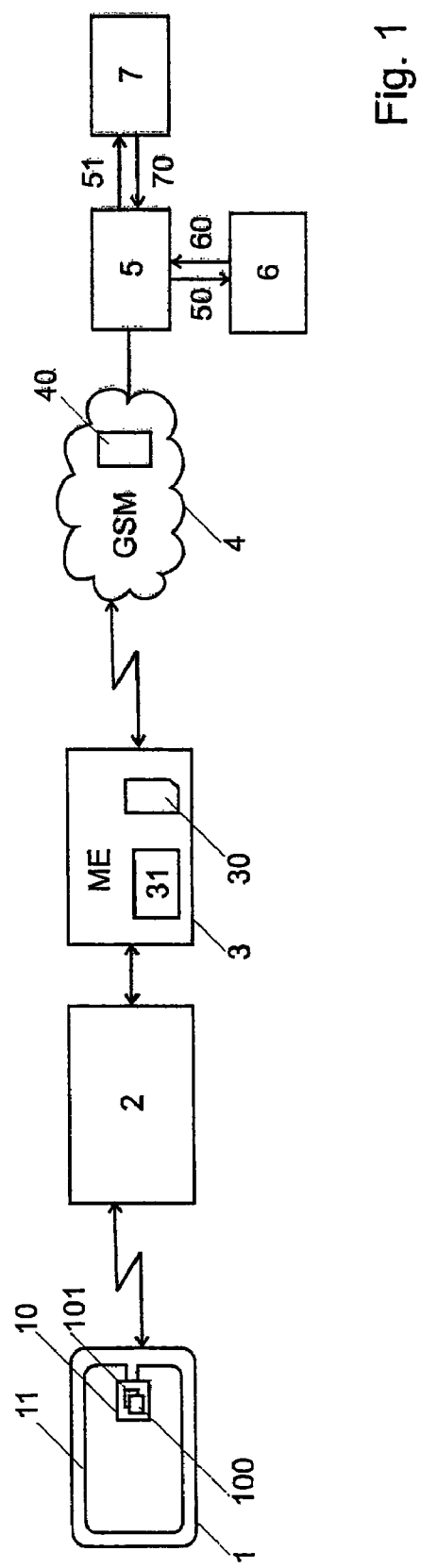
FIG. 1 shows a block diagram of a system with a mobile device, an RFID reader device, a conventional RFID tag and a remote server.

FIG. 1 shows a system that is used by a user (for example a mobile subscriber) for ordering information (including services) about a product. The system and method of FIG. 1 are new in many respects, yet use a known RFID tag 1 in the EPC format.

A terminal 3, in this case a portable mobile device, includes an RFID reader part 2 or is connected with such a reader part, for example over a USB, Firewire, PCCard, CompactFlash, proprietary etc. connection or over a Bluetooth or WLAN contactless connection. The terminal 3 contains an identification module 30 (for example a SIM card) to identify the device through the network 4 with a mobile radio network infrastructure 40. One or several software applications can be executed by a processor in the terminal 3.

The reader part includes a microcontroller and least one antenna or coil for exchanging data with RFID components (tags) in the immediate vicinity. The data transmission occurs preferably in the frequency range of 13,56 Mhz, 900 Mhz and/or 860-930 Mhz. The reader part 2 can preferably be chosen to work in different frequency ranges and with different RFIDs. The operational range for reading the RFID is preferably between 2 and 10 meters—depending on the orientation of the reader part and of the tag. The connection preferably occurs in half-duplex mode with an ASK backscatter modulation.

A product comprises one or several tags 1. Each tag 1 has at least one chip 10 and one antenna 11. Each chip 10 contains a permanent memory area in which a code 100, 101 in the EPC format is stored during manufacture or during personalization of the tag.

The code identifies univocally each particular tag 1; each tag has another EPC code 100, 101. The EPC code 1001, 101 preferably cannot be falsified.

The EPC code 100 preferably includes 64, 96 or more bits and is organized hierarchically. The reply 1000 of the tag 10 to a query of the reader part 2 preferably includes a header 1001, redundant verification data 1002 and only then the code 100 (cf. FIG. 5).

Several EPC codes in a product in the vicinity of the reader device 2 can also be read simultaneously or preferably one after the other. The query of the reader device 2 can indicate a number range and each tag 1 decides on the basis of this number range with which code or codes it will answer this query.

Other data can be stored in the memory area of the chip 10 and be read by the reader part 2.

The chip 10 is preferably a read-only chip that can be produced at low cost and in a small size; two read-only chips are often less expensive than a single re-writable chip. Re-writable chips can however also be used within the frame of the invention.

The EPC codes 100 are preferably distributed by a common authority to different product manufacturers, mobile radio network providers and value added service providers; part of the EPC code preferably indicates the identity of the provider of the product. The product provider reserves a series of codes from the common authority and stores part of these EPC codes in tags 1 that are then distributed with the products. A product can be provided by several organizations with different tags.

At least one application is provided in the mobile device 3 for reading EPC codes 100 in neighboring tags over the reader part 2 for ordering further information or services, as will be described later.

Reading an EPC code is preferably initiated by the terminal 3; it is possible for example that the terminal 3 continuously or periodically searches for neighboring tags 1 and reads, processes or forwards the EPC codes in found tags 1. In another, low-current embodiment, reading is initiated by the user of the terminal 3 that launches a corresponding application or enters a command if he wishes to read a tag 1. Reading the tag 1 with the terminal 3 or with another device can also be initiated by an external device (for example a selling point or an automatic machine) over an interface at close range (for example Bluetooth or WLAN) over the mobile radio network 4 or over a link on a visited WEB or WAP page.

The EPC code 100 read in the tag 1 is packaged by an application 31 in an order message (for example in a short message or preferably in a GPRS or UMTS packet) and sent to a server 5 in order to retrieve further information from a PML server 7, as will be described later.

A mobile device as terminal 3 (for example a mobile radio telephone or a PDA with an interface for a cellular mobile radio network) can receive short messages (for example SMS and USSD) and data (for example IP packets) from a mobile radio network 4 and send them to this network. The mobile radio network 4 is for example a GSM, GPRS, HSCSD, EDGE, UMTS or CDMA network over which data can also be transmitted.

Simple filters and processing means can be provided as part of the application in the terminal 3 and/or in the reader device 2, in order to process a read EPC code. The application can for example process and forward only certain parts of EPC codes. Redundancy checks can also be provided to delete codes that are not plausible or that contain errors. Previously used codes are preferably stored in a database in the terminal 3 for the purpose of future controls, statistic evaluations and backups.

In one embodiment, the password consists of part of the EPC code 100 or can be determined from this EPC code with a function. The password can for example result from a signature of the EPC code that can be verified with a public key. In this case, the password can be determined from the EPC code only if the unauthorized third party knows the corresponding function or the private signing key. This embodiment has the advantage that the application can verify the validity of the password merely on the basis of the EPC code.

In another embodiment, the validity of the password is verified on the basis of a table in the SIM card, in the mobile device or in an external server.

In yet another embodiment, the password is stored in the tag 1 and verified by the tag 1. This embodiment however requires expensive tags that can also store, receive and compare passwords.

The system and method of FIG. 1, that uses a mobile device for processing and forwarding the EPC code, already has many advantages over known EPC systems and methods, but has all previously mentioned disadvantages of RFID tags. We will now describe on the basis of FIGS. 2 to 4 several embodiments of the method and system according to the invention that avoid these disadvantages. Other method and system features that have been described up to now in connection with FIG. 1 and that do not concern directly the RFID tag 1 can also be used in the frame of the invention and in connection with the embodiments of FIGS. 2 to 4.

Figure 2:
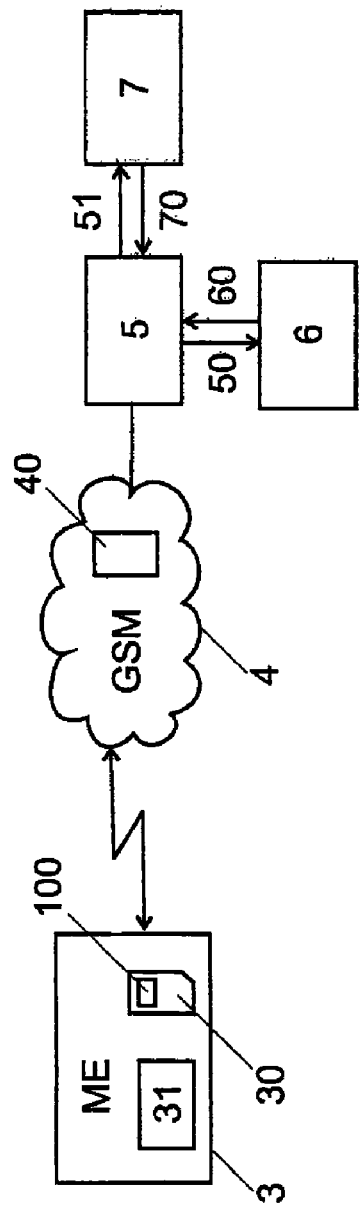
FIG. 2 represents a block diagram of a system with a remote server and a terminal in which an application runs that uses a virtual EPC code.

The system illustrated with FIG. 2 has all the features of the system of FIG. 1, except that the EPC code 100 is stored in an identification module 30, for example in a SIM card or in a user identification module in the terminal 3. The terminal 3 can for example be a mobile telephone, a PDA or a set-top box and can access said memory area in the identification module 30 for reading the EPC code 100.

The EPC code in the identification module 30 can be stored permanently or semi-permanently, for example in the module's EEPROM, can be generated dynamically or be downloaded over the mobile radio network 4. The code 100 can for example be used for identifying univocally processes, software, program parts, data, files or operations in the module 30 and for retrieving an associated content from a remote server 7.

An application 31 in the terminal 3 and/or in the identification module 30 sends the EPC code read from the identification module 30 or generated by the identification module over the mobile radio network 4 to a server 5 at a known address, preferably a server within the infrastructure 40 of the mobile radio network 4. The service order message is optionally signed and/or provided with a time stamp by the terminal 3 or by the SIM card 30.

The server 5 administers order messages with codes and parameters that are received by several or possibly all terminals 3 and by conventional RFID readers. Other, more complex filters can be provided in the server 5 in order to handle codes from different areas differently or not at all.

A password can also be required by the server 5 for the EPC code to be processed at all; this password can bee derived from the code itself or be verified on the basis of a table. The password is for example transmitted to the server 5 in a message together with the code 100. or separately in the frame of a dialogue The server 5 can also verify the identity of the user of the terminal 3. This is all the more reliable if the server 5 is administered by the operator of the mobile radio network 4. In this case, the identity of the mobile user can be determined reliably for example on the basis of the IMSI (International Mobile Subscriber Identity) or of another mobile subscriber identity in the SIM card. Access to certain information and services is made available only to certain users (for example mobile users having a corresponding subscription, having a sufficient balance on a money account, or whose profile allows the supplying of the service).

If the password is wrong or if the desired information or service cannot be made available for any other reason, a message is preferably sent to the user (for example over SMS, USSD or Internet). After several failed attempts, further attempts can be blocked definitively or temporarily for security reasons. In this manner, it is possible to prevent that valid EPC codes can be guessed through repeated attempts.

The server 5 is connected over Internet or an intranet with an object name server 6 in which each EPC code 100 is connected with the corresponding electronic address of an electronic Hypertext page. One can thus access another address for each individual product.

A query 50 with the code 100 just received is directed by the server 5 to the object name server 6, which answers with the corresponding electronic address (reply 60). The electronic address consists for example of an URL or another address for a TCP-IP network.

The object name server 6 can be administered by the operator of the server 5 and/or by external entities (for example by the organization distributing the EPC codes 100). Several object name servers can be connected with one another so that the desired address is sought in another object name server if it is not found in the server 6. This allows for example a mobile radio network operator to process also EPC codes from other organizations. A local cache of an external name service can also be provided in the server 5 or in the domain of the server 5.

The user of the terminal 3 can thus always send all codes 100 of all service providers to the same target server 5, that determines from the name service-server 6 or from the network of name service-servers 6 the address of the page on the basis of which the desired information or service is made available. Processing the order message thus depends only on the EPC code. Similar messages that reach different servers 5 of several service providers can thus cause the exact same service or information to be made available.

The connection in the name service-server 6 between a code 100 and a page address can preferably be modified anytime by the provider of the desired information (for example over a dedicated WEB form). This allows the electronic address of a page or of a domain to change without having to inform the end users.

The address of the desired page can thus be found only and univocally on the basis of the code stored in the tag 1; the page that is accessed is thus completely independent from the address or telephone number of the server 5.

The server 5 receives the reply 60 from the object name server 6 with the desired page address and accesses the corresponding PML page in the server 7 or a network with several local or remote servers (query 51 and reply 70 in FIG. 1). The hypertext page can be static; in a preferred embodiment, it is however generated dynamically depending on the transmitted parameters.

The page in the server 7 that is accessed by the server 5 possibly includes a hypertext content in a markup language. In a preferred embodiment, the page includes a PML (Product Marking Language) content. The page can also support SOAP protocol (Simple Object Access Protocol), .NET Framework or other web services with which the server 5 and finally the terminal 3 can access services and objects of the server 7. In this case, the method includes making available executable program code elements or SOAP and/or .NET services.

The server 5 downloads the desired page from the server 7 and/or accesses the desired service (or the object at the indicated address) to supply the desired service or information to the user of the terminal 3. The user can reproduce the desired information for example with a normal browser on his terminal 3.

Figure 3:
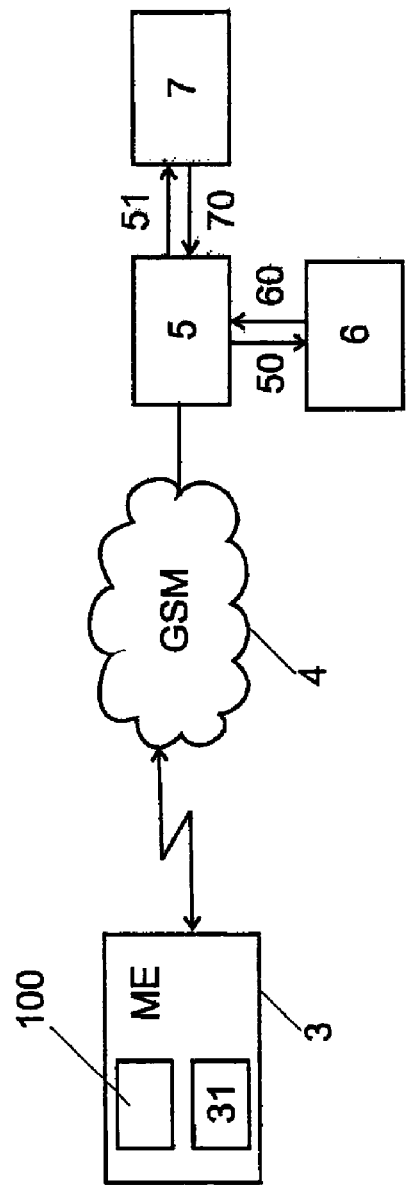
FIG. 3 illustrates a block diagram of a system with a terminal in which a virtual EPC code is stored and a remote server.

The system illustrated with FIG. 3 has all the features of the system of FIGS. 1 and 2, except that the EPC code 100 is determined by an application 31 in the terminal 3. The terminal 3 can for example be a mobile telephone, a PDA or a set-top box and can execute said application to read the EPC code 100.

The EPC code 100 in the terminal 3 can be stored permanently or semi-permanently, can be generated dynamically or be downloaded over the mobile radio network 4. The code 100 can for example be used for identifying univocally processes, software, program parts, data, files or operations in the terminal 3 and for retrieving an associated content from a remote server 7.

In a variant embodiment, not represented, the terminal 3 determines the EPC code 100 from a magnetic, optical or magneto-optical data medium that is read by the terminal 3. In yet another variant, the code is downloaded by the terminal over a remote telecommunication network, for example from a WEB or WAP server. In yet another variant, it is received by the terminal and forwarded to the EPC network over e-mail, SMS or another kind of short message. In yet another variant, the code is read by the terminal over a personal area network (PAN), for example from another personal terminal or from a payment terminal in the immediate vicinity.

The system illustrated with FIG. 4 has all the features of the system of FIGS. 1 to 3, except that a virtual EPC code 100 is generated by an EPC code generator 8 and sent over an interface to the terminal 3. The EPC generator 8 can preferably generate a plurality of different virtual EPC codes 100; in one variant embodiment, it is programmable and can thus generate any EPC code or codes in one range. In one embodiment, the EPC code generator is connected with an object name server 6 for verifying whether the EPC code has already been allocated to a PML page. In yet another variant, the PEC code generator can generate the EPC code corresponding to a desired PML page by sending a corresponding query to an object name server.

In one embodiment, the EPC code generator is connected with the terminal 3 over a contactless, for example a radio, interface. The EPC code generator 8 preferably uses a data transmission protocol that is also used by EPC RFID reader devices for reading RFID tags, so that generated virtual EPC codes 100 can also be read by normal EPC-compatible RFID reader devices 2; in this case, the EPC code generator simulates a conventional EPC RFID tag, although no fixed EPC code is allocated to it.

The EPC code generated by the generator 8 and determined by the terminal 3 is then forwarded to the object name server 6 and processed as in the previously described method in order to download the content of the corresponding PML page into the terminal 3.

It is thus possible to use the entire infrastructure of the EPC network and retrieve data and information from this network, without having to provide an EPC-compatible RFID tag. Instead, virtual EPC codes are used in the present invention. Virtual EPC codes have a standardized format for EPC numbers and at least one of the following features:

They are not permanently or never associated with an RFID tag.
They are not or never embedded in an RFID tag.
They can be used for retrieving information from an EPC network without having to be read previously from an RFID tag.
They are generated independently of RFID tags.
Virtual EPC codes can be stored in memory areas outside EPC-compatible RFID tags and/or be generated dynamically.

In this manner, information from the EPC network, e.g. PML pages, can be associated with goods that are not marked with an RFID tag, such as for example intangible goods such as computer files, computer programs, services, a data stream, generally for the protection of a copyrighted resource, etc.

The invention also relates to a device including means 8 for generating the virtual EPC codes 100 independently of EPC RFID tags 1, means for storing the virtual EPC 100 codes independently of EPC RFID tags 1 and communication means for sending said EPC codes to an EPC network 4, 5, 6, 7.

REFERENCE LIST

1 RFID tag
10 Chip
11 Antenna
100 Code
101 Code
1000 Reply
1001 Header
1002 Verification data
2 RFID reader part
3 Terminal
30 Identification module
31 Application
4 Mobile radio network
40 Mobile radio network infrastructure
5 Server
50 Query
51 Query
6 Name server
60 Reply
7 Server
70 Reply
8 EPC generator

The invention claimed is:

1. A method for generating virtual EPC codes independently of an RFID tag using a programmable EPC generator, said method comprising the steps of:
   programming said EPC generator to generate any virtual EPC code or codes in a predefined number range;
   generating said EPC code or codes in the predefined number range using said EPC generator; and
   associating said EPC code or codes with intangible goods.

2. The method for generating virtual EPC codes according to claim 1, wherein the EPC generator uses a data transmission protocol that is also used by EPC RFID reader devices for reading RFID tags, so that generated virtual EPC codes can also be read by conventional EPC-compatible RFID reader devices.

3. A virtual EPC Code generator for generating virtual EPC codes independently of a RFID tag, said EPC generator being adapted to be programmable to generate virtual EPC code or codes in a predefined number range, wherein said EPC code or codes are associated with intangible goods.

4. The virtual EPC Code generator according to claim 3, wherein the EPC generator uses a data transmission protocol that is also used by EPC RFID reader devices for reading RFID tags, so that generated virtual EPC codes can also be read by conventional EPC-compatible RFID reader devices.

5. A method for generating virtual EPC codes independently of a RFID tag using an EPC generator, said method of generating at least one virtual EPC code for a PML page by either:

connecting said EPC generator with an object name server for verifying whether a EPC code has been allocated to a PML page and then generating at least one virtual EPC code for said PML page if no such code has been allocated, or generating an EPC code corresponding to the PML page by sending a query to the object name server.

6. The method for generating virtual EPC codes according to claim 5, wherein PML pages are associated with intangible goods including one or more of: computer files, computer programs, services, a data stream, or generally for a copyright resource.

7. A virtual EPC Code generator comprising an interface for either:

connecting said EPC generator with an object name server for verifying whether a EPC code has been allocated to a PML page, wherein said EPC code generator is adapted for generating at least one virtual EPC code independently from a RFID for said PML page if no such code has been allocated, or an interface for sending query to an object name server, wherein said EPC generated is adapted for generating an EPC code corresponding to a desired PML page by sending said query.

8. The virtual EPC Code generator according to claim 7, wherein PML pages are associated with intangible goods including one or more of computer files, computer programs, services, a data stream, or generally for a copyright resource.

9. A method for generating virtual EPC codes, comprising the steps of:

generating at least one virtual EPC code, which is independently from a RFID tag;

storing said virtual EPC code permanently or semi-permanently in an identification module of a mobile device; and storing the virtual EPC code in a SIM card of the mobile user device.

10. The method for generating virtual EPC codes according to claim 9, further comprising the step of using the virtual code for univocally identifying processes, software, program parts, data, files or operations in the mobile user device.

11. The method for generating virtual EPC codes according to claim 9, further comprising the step of generating said at least one virtual EPC code using said identification module.

12. the method for generating virtual EPC codes according to claim 9, further comprising the steps of:

reading said at least one virtual EPC code by executing an application in the mobile device or in the identification module;

sending said at least one virtual EPC code to a server in an infrastructure of a mobile radio network; and receiving information from said server based on said at least one virtual EPC code.

13. The method for generating of virtual EPC codes according to claim 9, further comprising at least one of the following additional steps:

determining said virtual EPC code from a magnetic, optical or magneto-optical data medium;

downloading the virtual EPC code over a mobile network to said mobile device; or receiving said virtual EPC code over a personal area network from another mobile device or a payment terminal in the immediate vicinity of said mobile device.

14. A mobile device including an identification module, said mobile device comprising an EPC code generator for generating at least one virtual EPC code, which is independently from a RFID tag; and a memory for storing said EPC code permanently or semi-permanently, wherein said mobile device is a mobile telephone, a PDA, a PDA with an interface for a cellular mobile radio network or a set-top-box.

15. A mobile device including an identification module, said identification module comprising an EPC code generator for generating said at least one virtual EPC code, wherein said mobile device is a mobile telephone, a PDA, a PDA with an interface for a cellular mobile radio network or a set-top-box.

16. The mobile device according to claim 15, wherein said identification module is a SIM card of said mobile user device.

17. The mobile device according to claim 15, wherein the virtual EPC code univocally identifies processes, software, program parts, data, files or operations in the mobile device.

18. The mobile device according to claim 15, further comprising an application for reading said at least one virtual EPC code in the identification module and for sending said virtual EPC code to a server in an infrastructure of a mobile radio network.

19. The mobile device according to claim 15, wherein said virtual EPC code is stored in said identification module.

20. The mobile device according to claim 15, wherein said EPC code generator is programmable to generate any virtual EPC code or codes in a predefined number range.

21. The mobile device according to claim 15, wherein the EPC code generator uses a data transmission protocol that is also used by EPC RFID reader devices for reading RFID tags, so that generated virtual EPC codes can also be read by conventional EPC-compatible RFID reader devices.

* * * * *